July 28, 1931.   C. G. BUTLER   1,816,567
GREASE GUN COUPLING
Filed March 26, 1928
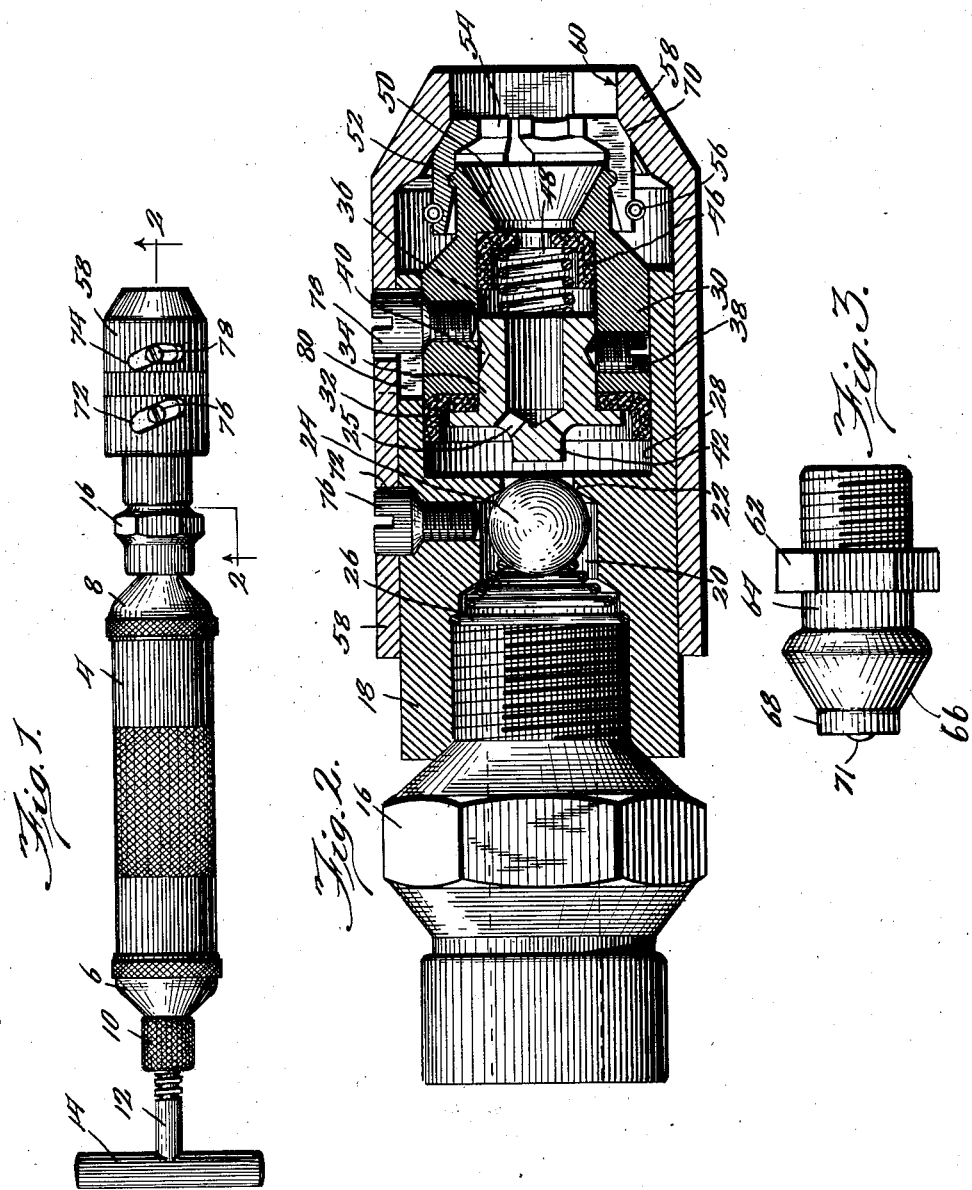

Patented July 28, 1931

1,816,567

UNITED STATES PATENT OFFICE

CLYDE G. BUTLER, OF CINCINNATI, OHIO, ASSIGNOR, BY MESNE ASSIGNMENTS, TO ALEMITE CORPORATION, OF CHICAGO, ILLINOIS, A CORPORATION OF DELAWARE

GREASE GUN COUPLING

Application filed March 26, 1928. Serial No. 264,734.

My invention relates, generally, to valved couplings and more particularly to a coupling for use in lubricating apparatus in which a quick detachable connection is to be made between a source of lubricant under pressure and a fitting attached to the bearing to be lubricated.

It is an object of my invention to provide a valved coupling in which the number of operating parts is greatly reduced and the construction simplified, and which may be economically manufactured.

A further object is to provide an improved valved coupling in which the operation of opening the valve and making the connection with the bearing are performed merely by rotating the nozzle with respect to the lubricant receiving fitting.

A further object is to provide an improved valved coupling in which means are provided to preclude the opening of the valve before the coupling operation has been completed.

Other objects will appear from the following description, reference being had to the accompanying drawings, in which Fig. 1 is a plan view of a well-known type of hand operated compressor or grease gun with the improved nozzle of my invention attached thereto;

Fig. 2 is a vertical sectional view of the nozzle taken on the line 2—2 of Fig. 1; and Fig. 3 is an elevation of the lubricant-receiving fitting which forms part of the coupling.

The compressor shown in Fig. 1 comprises generally a barrel 4 having an upper cap 6 and lower cap 8 threaded thereto. A knurled nut 10, threaded at the outer end of cap 6, is internally threaded to receive the stem 12. The stem 12 has a handle 14 at its outer end and the usual cup leather piston (not shown) secured at its opposite end. A union 16 is threaded to the end of the lower cap 8 and carries a nozzle body 18 which is suitably bored and counterbored to provide a valve chamber 20 and a valve seat 22. A ball valve 24 is held against the seat 22 by a spring 26 which seats against the end of the union 16. The outer end of the body 18 has a large bore 28 which forms a cylinder and guide for a reciprocable member 30. The member 30 has a cup leather 32 secured thereto by a valve opening element 34 which has a tubular portion extending within a bore 36 in the member 30 and is secured therein by a set screw 38, the point of which rests in an annular V-shaped groove 40 formed in the element 34. The element 34 has an inward projection 42 which is adapted, when actuated, to contact with the ball valve 24 and raise it from its seat 22.

An apertured cup leather 46 is held at the outer end of the bore 36 by a compression spring 48. The outer end of the member 30 is of reduced diameter and has a frusto-conical recess 50 formed therein.

An annular rib 52 formed near the extremity of the reduced diameter end-portion forms a fulcrum for a plurality of clamping jaws 54 which have grooves formed on their inner surfaces to bear upon the rib 52 and are normally held with their outer ends separated by a toroidal spring 56 which fits in suitable grooves formed in the outer surface of the jaw elements 54. A sleeve 58 has a hexagonal opening 60 in its outer end which is adapted to fit over a hexagonal flange 62 formed on a suitable lubricant-receiving fitting 64. This fitting has one end threaded so that it may be screwed into the oil hole of the bearing to be lubricated and at its other end has a frusto-conical head 66 of large diameter and a relatively short cylindrical end portion 68. The fitting is axially bored and has its outer end normally closed by the usual spring pressed ball check valve 71.

The sleeve 58 has a conical camming surface 70 which is adapted to contact with complementary surfaces formed on the clamping jaws 54 and force them inwardly behind the head 66 of the fitting whenever the sleeve is moved inwardly (to the left of Fig. 2) and thereby clamp the nozzle to the fitting.

The sleeve has a pair of cam slots 72 and 74 formed therein. A fillister head cap screw 76, threaded in the body 18, has its head engageable with the walls of the slot 72 and a similar screw 78 screwed into the member 30 has its head engageable with the walls of the slot 74. A longitudinal slot 80 formed in the body 18 which receives the shank of the screw 78, prevents the member 30 from rotating with respect to the body 18. It will be noted that the slot 72 is of constant pitch while the slot 74 has a dwell portion which has no pitch for approximately half its length and has a pitch approximately the same as that of the slot 72 for the remaining diagonal portion of its length.

The operation of the coupler will now be described. Assuming that the sleeve 58 is in its extreme right-hand position, the outer ends of the jaws 54 will be held sufficiently separated by the spring 56 to permit them to pass over the head 66 as the coupling is applied to the fitting. The cylindrical end portion of the fitting 64 will project into and press against the cup leather 46 and move the latter a short distance to the left so that the spring 48 is effective to hold the cup leather against the nipple and form an initial lubricant-tight seal which is later reinforced by the pressure of the lubricant.

The conical surface of the head 66 will seat in the conical recess 50 in the member 30. In this operation the hexagonal opening 60 will fit over the flange 62. The compressor will then be rotated clockwise with respect to the fitting at which time the sleeve 58 will be held stationary relative to the fitting by the hexagonal flange 62.

Through the interengagement of the screw 76 with its slot 72 and the screw 78 with the diagonal portion of its slot 74, the nozzle body and all of the other parts within the sleeve 58 will be moved toward the fitting, thus closing the clamping jaws 54 and forcing the head 66 firmly against the walls of the recess 50 and its cylindrical end portion 68 firmly in contact with the cup leather 46.

Further rotative movement of the compressor with respect to the fitting will cause the body 18 to move toward the member 30. The member 30 is held stationary with respect to the fitting due to the fact that during this further rotation its pin 78 is in the dwell portion of its slot 74.

As the body 18 is moved toward the member 30, the projection 42 engages the ball valve 24 and raises it from its seat 22, thus permitting lubricant to flow from the compressor past the ball valve 24, through suitable apertures 25 formed in the element 34, through the perforation in the cup leather 46 and past the ball closure 70 of the fitting to the bearing. If desired, the lubricant in the compressor may be placed under initial high pressure before the coupling operation is effected so that as soon as the valve 24 is raised from its seat, lubricant will flow with an explosive action, due to the expansion of the compressed air which is always present in the lubricant to a greater or lesser extent, into the bearing to be lubricated.

It will be noted that the lubricant will act upon the rear face of the cup leather 48, thus increasing the force with which it is held in sealing contact with the end of the fitting. Lubricant pressure is also exerted upon the inner surfaces of the cup leather 32, thus holding it against the surface of the bore 28 and preventing leakage between the member 30 and the body 18.

After sufficient lubricant has been supplied to the bearing, the compressor is rotated counterclockwise. During the first motion of this rotative movement the body 18 is forced to move outwardly with respect to the member 30 because of the interengagement of the screw 76 with its slot 72, thus permitting valve 24 to close. At the same time the screw 78 lies in the dwell portion of its slot 74 so that the nozzle is held rigidly coupled to the fitting. However, the rotative movement brings the screw 78 into engagement with the diagonal portion of the slot 74. Continued counterclockwise rotation of the compressor will cause the body 18 and member 30 to move away from the fitting as a unit. During this operation the jaws are withdrawn from the conical camming surface 70 and the spring 56 permitted to separate the outer ends of the jaws so that the nozzle may be removed from the fitting.

While I have shown and described a particular embodiment of my invention, I am aware that various other embodiments thereof may be made without departure from the principles of my invention. I therefore desire its scope to be limited only by the claims which follow.

I claim:

1. A quick detachable coupling for lubricating apparatus comprising a nozzle body, an inwardly opening check valve normally preventing flow of lubricant from said nozzle, axially slidable means for opening said valve, means carried by said axially slidable means non-rotatable with respect to said body for making a mechanical connection with a lubricant-receiving fitting, a sleeve rotatable and axially slidable with respect to said body, and cooperative means on said sleeve, said nozzle body, and said axially slidable means for compelling actuation of said coupling means prior to the actuation of said valve opening means, said cooperative means including a longitudinal slot in said nozzle body, a pair of oblique slots in said sleeve, a pin secured in said body and projecting into one of said oblique slots, and a second pin secured in said axially slidable means and projecting through said longitudinal slot and into the other of said oblique slots.

2. In a device of the class described, the combination of an apertured nozzle body, a valve normally closing the aperture in said body, valve opening means slidable in said body, said means comprising a body member, a gasket, a valve abutting element clamping said gasket to said member, means operatively connected to said valve opening means for making a quick detachable connection with a lubricant-receiving fitting, a sleeve adapted to be held against rotation by the fitting, and camming means on said sleeve operative upon rotation of said body relative to said fitting for moving said nozzle body and said valve opening means axially toward said fitting and subsequently holding said valve opening means stationary with respect to said fitting and continuing to move said body toward said fitting, whereby a sealed connection will be made with said fitting prior to the opening of said valve.

3. In a device of the class described, the combination of an apertured nozzle body, a valve normally closing the aperture in said body, valve opening means axially slidable in said body, coupling means operatively connected to said valve opening means for making a quick detachable connection with a lubricant-receiving fitting, a sleeve having a pair of slots and means cooperating with the fitting to prevent rotation relative thereto and cooperative means on said valve opening means and on said body engageable with the slots in said sleeve for moving said body and said valve opening means axially toward said fitting, and subsequently holding said valve opening means stationary with respect to said fitting and continuing to move said body toward said fitting upon rotation of said body with respect to said fitting, whereby a sealed connection will be made with said fitting prior to the opening of said valve, the said means on said valve opening means also preventing relatively rotative movement of said valve opening means with respect to said body.

4. A quick detachable coupling for lubricating apparatus comprising a nozzle body, an inwardly opening check valve normally preventing flow of lubricant from said nozzle, valve opening means slidable in said body, means to prevent relative rotative movement of said valve opening means with respect to said body, coupling means for making a mechanical connection with a lubricant-receiving fitting carried by said valve opening means, a sleeve rotatable and axially slidable with respect to said body, and cooperative means on said sleeve and said nozzle body and said axially slidable means for compelling actuation of said coupling means prior to the actuation of said valve opening means, said means comprising pins secured in said body and in said valve opening means, and cam slots in said sleeve.

5. A quick detachable coupling for lubricating apparatus comprising a nozzle body having a bore at its extremity, a spring pressed valve in said body, a member reciprocable in said bore, a cup leather having its face against one end of said member, and its flange contacting with the wall of said bore, a valve opening element secured to said member and holding said cup leather, a sleeve rotatably and longitudinally slidable on said body, and means operatable upon rotation of said sleeve to make a coupling connection with a lubricant receiving fitting and to move said member longitudinally to open said valve.

6. A quick detachable coupling for lubricating apparatus comprising an apertured nozzle body, a spring pressed ball check valve normally preventing flow of lubricant from said nozzle, an open-mouthed chamber at one end of said nozzle body, axially slidable valve opening means positioned in said chamber, means for making a fluid-tight connection with a lubricant fitting on one end of said valve opening means, means for making a lubricant seal between said valve opening means and the walls of said chamber, a sleeve surrounding said nozzle body and pin and cam slot means on said sleeve, said nozzle body and said valve opening means for compelling actuation of said coupling means prior to the actuation of said valve opening means.

In witness whereof, I hereunto subscribe my name this 22nd day of March, 1928.

CLYDE G. BUTLER.